United States Patent Office 2,878,468
Patented Mar. 17, 1959

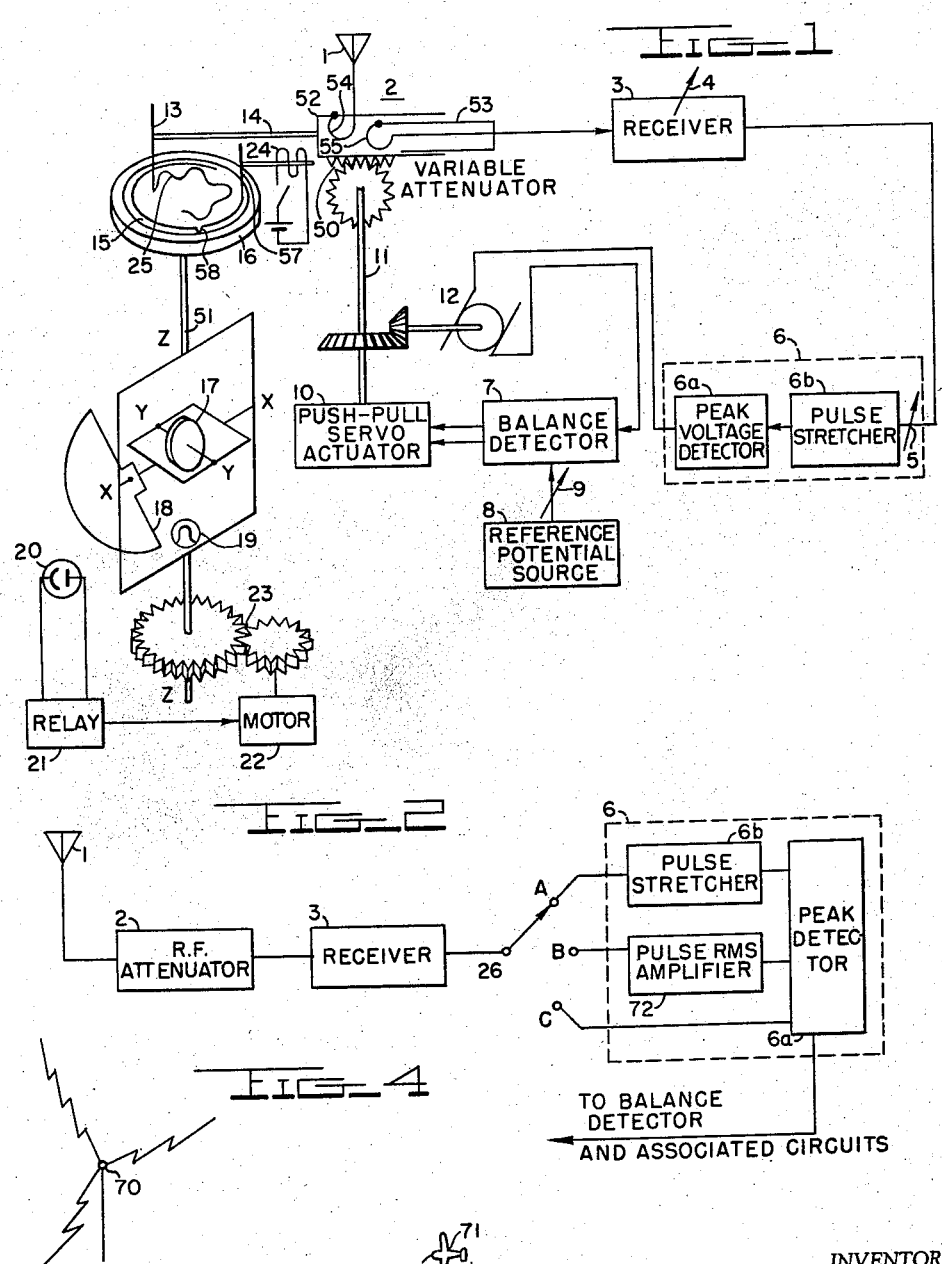

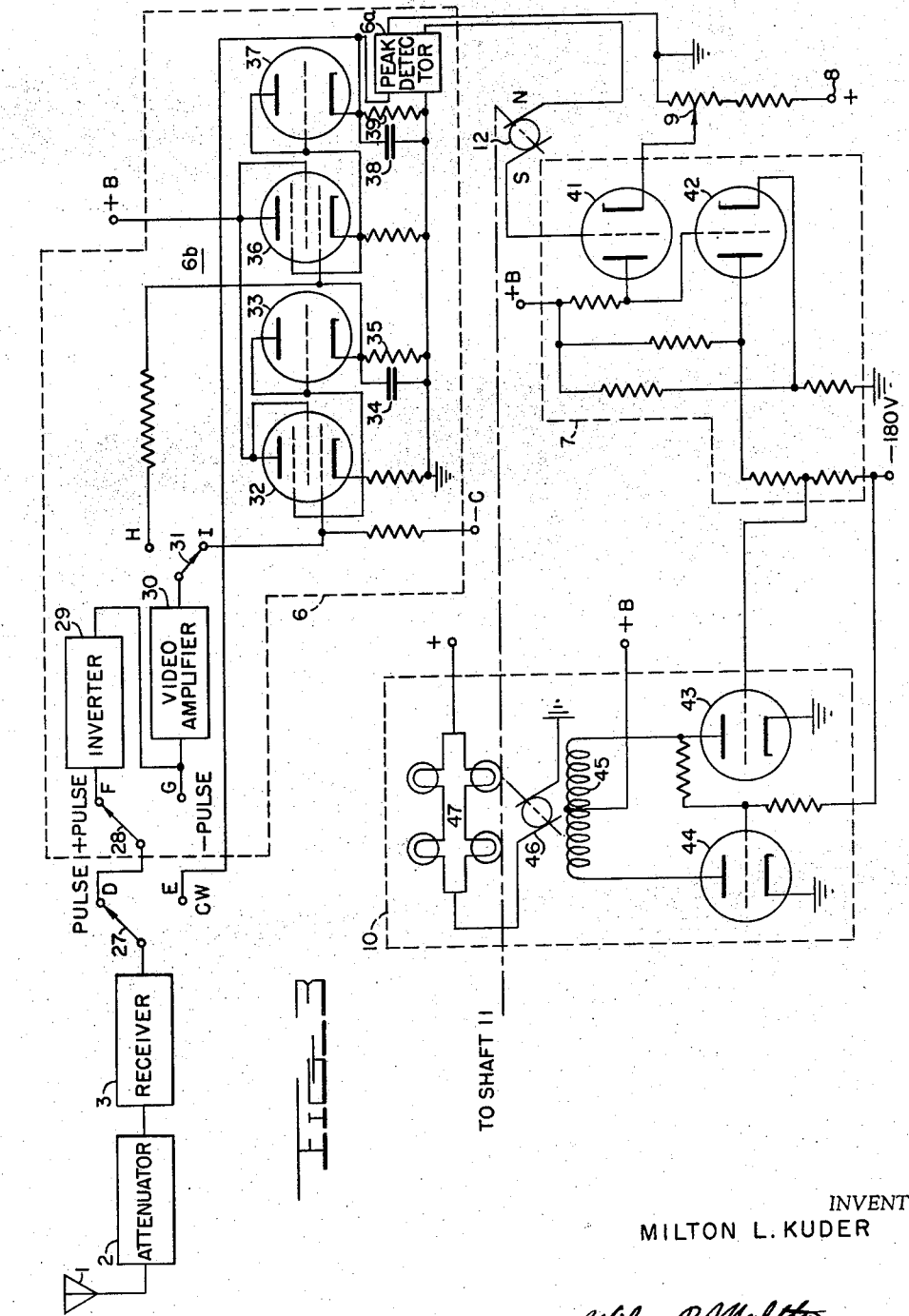

2,878,468

ANTENNA PATTERN RECORDER

Milton L. Kuder, Washington, D. C.

Original application March 18, 1946, Serial No. 655,360, now Patent No. 2,763,859, dated September 18, 1956. Divided and this application March 7, 1955, Serial No. 492,816

7 Claims. (Cl. 343—100)

(Granted under Title 35, U. S. Code (1952), sec. 266)

The invention described herein may be manufactured and used by or for the Government of the United States of America for governmental purposes without the payment of any royalties thereon or therefor.

This invention relates to the measurement and recording of the strength of electrical signals or of electromagnetic fields and, more particularly, to the determination of the radiation pattern of an antenna system.

This application is a division of my co-pending application, Serial No. 655,360, filed March 18, 1946, now U. S. Patent No. 2,763,859, issued Sept. 18, 1956.

Previous methods of determining radiation patterns have in general been laborious and slow, and have often introduced considerable error. This is conspicuously true in the measurement of the radiation patterns of antennas installed in aircraft. This invention eliminates errors caused by such things as fading that occur during the long time usually required in performing measurement. It is independent of the calibration of the receiver used in such measurements and also of the receiver's dynamic range.

An object of this invention is to provide automatic, rapid, and continuous measurement and simultaneous recording of the radiation pattern of an antenna system.

Another object of this invention is to provide a suitable method of and means for automatically obtaining and recording the radiation pattern of an antenna installed in aircraft.

Another object of this invention is to provide means for obtaining the radiation pattern of an antenna by use of the radiated signal provided by a transmitting source supplying either pulse type transmission, or modulated or unmodulated continuous wave transmission.

Another object of this invention is to provide means for obtaining the radiation pattern of an antenna by use of any communications or pulse type receiver.

Another object of this invention is to provide means for obtaining the radiation pattern of an antenna in a manner that is independent of the characteristics of the receiver employed, provided the receiver is capable of detecting the weakest signal desired to be measured within the dynamic range provided by such means.

A further object of this invention is to provide means for measuring a signal over a large range of instantaneous signal strength, such range being limited to no arbitrary value, in general being much greater than that of radio receivers in general use.

Other objects and features of the present invention will become apparent upon careful consideration of the following detailed description when taken together with the accompanying drawings.

Fig. 1 is a schematic diagram, partly in block, showing one embodiment of the invention;

Fig. 2 shows, in part, a modified arrangement of the embodiment of Fig. 1;

Fig. 3 is a schematic diagram showing in greater detail a portion of the apparatus illustrated in Fig. 1, and Fig. 4 is a diagram illustrating the method of obtaining the radiation pattern of an airborne antenna.

Briefly, and according to the invention, it is desired to provide means to cause the signal received from the antenna under test to move an indicator, such as a sliding pointer, back and forth according to the strength of the signal. It is also desired to have this action occur over a sufficient range of values and have the response give a true indication of the strength of the signal. The antenna to be tested is mounted in an airplane in the manner in which it is to be used. The signal from the antenna is coupled to the input of a variable high-frequency attenuator, the output of which is coupled to a receiver. The receiver amplifies and detects the signal and passes it to a peaking device which produces a steady D.-C. output voltage that is proportional to the peak value of the output signal from the receiver. This D.-C. voltage is compared to a fixed D.-C. voltage and the combination fed to an actuating mechanism which is geared to the high-frequency attenuator and is able to move the attenuator in such a manner as to give increased or decreased attenuation of the signal at the input of the receiver. If the two D.-C. voltages are equal the actuating mechanism does not move and the attenuator remains stationary. If the signal from the antenna becomes less, the receiver output and D.-C. voltage from the peaking device become less and the two D.-C. voltages are no longer equal. The actuating mechanism is energized to move the attenuator so that it gives less attenuation. This action continues until the input to the receiver is thereby increased to a point where the two D.-C. voltages are again equal. If the signal from the antenna should increase, the chain of operations will repeat but in opposite directions so that the attenuation is increased till the two D.-C. voltages are again equal. It is seen that the input to the receiver is kept constant by this action so that the characteristics of the receiver do not appear in the result and that the range of instantaneous signal strength obtained is measured in terms of the attenuation required.

What is now required is to gear an indicator and stylus to the moving part of the attenuator so that its action is indicated and recorded. A record may be easily obtained by placing under the stylus a disk bearing a piece of polar graph paper, the disk being fixed in space in a horizontal plane by means of a gyroscope, and that part of the apparatus including the stylus, attenuator, and associated equipment is mounted in the airplane, so that it will move as the airplane turns in azimuth, thus providing relative motion between stylus and paper that is equal to the change in bearing of airplane and antenna.

In actually performing a measurement of the antenna radiation pattern the airplane is flown in a small circle without banking at a sufficient distance from the transmitter so that the transmitter and airborne antenna can be considered respectively as a point source fixed in space relative to a point receiver.

In the embodiment of Fig. 1 the antenna under test 1 is assumed to be receiving a pulse modulated transmission. The signal from antenna 1 is coupled to variable attenuator 2 which in turn is electrically connected to receiver 3 which has volume control 4. The signal after being amplified by receiver 3 passes through variable input 5 to a peaking device 6 which comprises a pulse stretcher circuit 6b and peak voltage detector 6a. The pulse stretcher 6b and peak voltage detector 6a widen the pulses until a steady direct current voltage proportional to the peak value of the pulse detected by the receiver is obtained from any pulse transmission having a pulse repetition rate commonly encountered in such transmissions. The output of the peaking device 6 is fed in series with a voltage from direct current generator 12 to one input of the balanced detector 7 which compares the output voltage with a fixed reference potential from source 8. The latter is adjustable as indicated at 9 to accommodate the nominal mid-range output of the receiver 3. The output of balanced-detector 7 is fed into an actuating mechanism which in this embodiment is preferred to be a push-pull servo actuator 10 which, in turn, produces mechanical rotation of shaft 11 geared by means of the rack and pinion 50 to the input section of attenuator 2. The character of this rotation is determined by the output of the balanced-detector 7. If the direct current output voltage of peaking device 6 is identical to the reference potential supplied by reference source 8, the balanced-detector 7 produces a balanced output and shaft 11 of the servo actuator 10 remains stationary. If, however, the two voltages being compared are not equal, the balanced-detector output is said to be unbalanced and shaft 11 will rotate either clockwise or counter-clockwise depending on the polarity of the unbalance.

The direction of rotation of shaft 11 is such as to vary attenuator 2 in a way that will maintain the voltage constant at the input to receiver 3 and consequently restore the balance between the output of the peaking device 6 and reference potential 8.

Direct current generator 12 produces a small voltage that is proportional to the speed of shaft 11 and opposite in polarity to the unbalanced voltage between peaking device 6 and reference source 8. The effect of this, together with the normal characteristic of servo actuator 10, produces a speed of rotation of shaft 11 that is proportional to the degree of unbalance. This means that there is virtually no lag in following sudden changes and that hunting is eliminated.

Since the receiver 3 input is maintained constant, the range of signal strength to be accommodated by the receiver 3 need not be great nor must it have a linear response characteristic. Hence, almost any available receiver can be used with the system.

Attenuator 2 slides back and forth according to the strength of the signal obtained from antenna 1 so as to maintain a constant input to receiver 3 at the output of attenuator 2. The couplings of the attenuator will be widely separated when there is a very strong signal on the antenna, close together for a weak signal, and at an intermediate position for a moderate signal. Thus, the position of the attenuator may be considered a direct function of the antenna field pattern. In this embodiment the attenuator is so constructed (as hereinafter described) that it offers an attenuation that varies logarithmically with displacement, so the displacement can be considered an indication of a change in field strength measured in decibels. To obtain a polar plot 25 of field strength in a horizontal plane XY, it is only necessary to attach a stylus 13 to the movable part of the attenuator by means of a lever system 14 and place under it a piece of polar graph paper 15 mounted on a platform 16 stabilized in azimuth so as to remain fixed with respect to the earth as the antenna 1, stylus 13, attenuator 2, and associated equipment are turned about a vertical axis Z. If the equipment is mounted in a mobile installation such as an airplane, for which this embodiment is designed, this relative motion is accomplished by means of a gyroscope 17 which, when set to spinning, would maintain its angular position in the horizontal plane XY indefinitely, were it not for the frictional torque caused by its bearings and the drag of the stylus 13. This torque appears about the vertical axis Z and it is a property of gyroscopes, when subjected to such a torque, to precess or rotate about the axis X. In order to prevent the gyro from precessing a torque opposing the frictional one is applied about the vertical axis Z.

This is done as follows: Attached to the X axis gimbal shaft is an aluminum vane 18 which will rotate in the ZY plane whenever the shaft rotates, as in precession. Mounted on opposite sides of this vane are a lamp 19 and a photoelectric cell 20. The vane 18 is placed so that no light falls upon the cell 20 when the gyroscope wheel 17 is in the XZ plane as said vane 18 cuts off the light beam to the cell 20, and a relay 21 which is operated by the photoelectric cell 20, is de-energized. In the de-energized position relay 21 operates an antiprecession motor 22 allowing it to exert the desired opposing torque to the Z axis shaft 51 through a gear train 23. Actually, this torque is greater than the frictional one, and the gyroscope 17 begins to precess in the opposite direction. As soon as it does however, the vane rotates out of the path of the light, the relay 21 is energized to reverse the armature connection to the motor 22, and the motor tends to aid the frictional torque. In this way the gyro wheel 17 hunts about its proper position in the XZ plane, and renders the system permanently stabilized in the horizontal or XY plane; or in any other single plane depending on how the system is mounted.

This apparatus, when installed in an airplane, provides an automatically recorded polar plot of the antenna pattern while the pilot flies in a skid turn as indicated in Fig. 4, of as small a radius as possible without banking. When the transmitting source 70 is very distant, say 50 miles, this is equivalent to the ideal method which would suspend the airplane 71 in air and rotate it in the horizontal plane about a fixed vertical axis. With the exception of the transmitting source, the entire system is mounted in the airplane.

Adjustment of the gain of receiver 3 as indicated at 4, of the input to peaking device 6 as indicated at 5 and of the reference potential 8 as indicated at 9, permits the apparatus to be correctly adjusted for optimum results. To further enhance the operating performance of the system it is desired to have stylus 13 be close to the edge of the polar graph paper 15 when the maximum signal is being received during the recording of a particular antenna pattern 25. At the same time it is desired to have the receiver 3 operate at an optimum point of sensitivity, i. e., at a point of high gain but sufficiently below saturation. It is also desired to have the values of the mean voltages present at output of peaking device 6 and reference source 8 to be of an order to minimize effect of noise and also be considerably larger than the voltage supplied by D. C. generator 12.

In its preferred embodiment, the attenuator 2 is somewhat similar to a section of wave guide in construction. It comprises an outer member 52, an inner member 53 which telescopically engages the outer member and a pair of magnetic coupling loops 54 and 55. Loop 54 represents the input loop to which the antenna 1 is connected, and loop 55 represents the output loop to which the receiver 3 is connected. The attenuator differs, however, from the normal wave guide in that its cross-sectional dimensions are smaller than that which would pass a wave of the fundamental propagation mode at the frequency at which the attenuator is to be used. That is, the cross-sectional dimensions are smaller than that for cut-off. It is well known to the art that a device of this nature will produce an attenuation to the energy coupled in that varies as a logarithmic function of its length. That is, the logarithm of this attenuation will be directly proportional to the distance along the attenuator the energy must travel between input and output coupling loops 54 and 55. The couplings may be fixed each to a section of an attenuator of two sections, one section fitting inside the other and sliding back and forth trombone-fashion to provide the variation in distance along the guide between couplings. Or, one coupling may be made free to move to and away from the other coupling while the total length of attenuator cavity remains fixed. This latter method is easily adaptable to use in an attenuator of circular construction.

It will be seen that since attenuator 2 is connected directly to the recording stylus 13, the dimensions and the interpretation of the radiation pattern 25 will depend on the nature of the action of attenuator 2. If attenuator 2 has an attenuation that varies logarithmically with displacement, the resulting antenna pattern could be interpreted as decibels along a linear radial scale. If attenuator 2 had an attenuation that is linear with displacement, the resulting antenna pattern could be interpreted as volts along a linear radial scale. The range of attenuation which can be provided by attenuator 2 of the wave guide type depends on its attenuation per unit length and is total length. Neither of these two variables has an arbitrary limit. When an attenuator has been designed for optimum range, a variation in the recording of antenna patterns is still available for antennas of different ranges of radiation strength by employing a variable gear ratio drive between attenuator 2 and stylus 13; for example, the variation in radiation strength of an antenna can be amplified in the recording by increasing the gear ratio. Other attenuators than the wave guide type may be used, many of which are known to the art.

In general, the peaking device 6 is the device preferred to follow receiver 3 when a pulse type transmission is being received. However, if the noise peaks are quite high and numerous, it would be advantageous in certain cases to obtain a voltage that is nearer to the effective value of the pulses rather than the peak value. If continuous wave transmission and reception is used, no pulse peaking device is required.

Fig. 2 shows provision made for these various types of transmission and reception. In this way, substantially any conventional type of receiver can be used. In a manner similar to that of Fig. 1, the signal is brought from antenna 1, through attenuator 2 to receiver 3. From there it is applied to a selector switch 26 which has three positions A, B, and C. Position A includes the pulse stretcher 6b and peak voltage detector 6a, and may be used for normal pulse reception; position B includes in its path a pulse amplifier 72 which is similar to the pulse stretcher 6b except it produces an output signal proportional to the RMS value of the input, and may be used for pulse reception when there is considerable noise interference; position C may be used when the transmission is a continuous wave.

When recording an antenna pattern 25 it is desired to have a ready reference means to identify the pattern absolutely with the angular orientation of the antenna 1. This may be accomplished by a solenoid, such as that indicated at 24, arranged so that when energized momentarily by pushing a button, it causes a second stylus 57 to give a quick radial movement, superimposing a small marker pip 58 on the circle normally traced by the second stylus 57. This stylus 57 is located at a known angle on the polar graph paper 15 with reference to the main stylus 13. This can be done at any time and in the case of an airplane installation may originate on a signal from the pilot at a given compass bearing or, for example, when the airplane is on a heading towards the transmitter. This also assists in the comparison of more than one pattern.

When the apparatus of Fig. 1 is installed in an airplane it is possible to obtain a radiation pattern in the vertical plane of antenna 1 as well as in the horizontal plane. For this, the apparatus is installed, for example, in a horizontal position in line with the wings and perpendicular to the fuselage. Then the airplane is flown in a circle in a vertical bank so that the apparatus is now mounted vertically with the platform 16 again upright. Except for this change, the action is similar to that for obtaining a pattern in the horizontal plane.

In Fig. 3, to which reference is now had, there is shown in more detail the elements of the peaking device 6, the balance detector 7, and the push-pull servo actuator 10 which drives the variable attenuator 2. The peaking device 6 includes a pulse inverter 29, video amplifier 30, a pulse stretcher circuit 6b and a peak voltage detector 6a. The pulse stretcher circuit 6b includes several vacuum tubes 32, 33, 36, 37 connected in cascade. The first tube 32 is connected as a cathode follower and delivers its output to the second tube 33 and associated circuits. The second tube 33 is connected as a diode with a cathode load consisting of a resistor 35 and shunting capacitor 34. Capacitor 34 charges upon conduction of tube 33 and together with the resistor 35 has a time constant that in general is considerably larger than the duration of the pulse. The signal voltage developed across the cathode load of tube 33 is connected to the grid of the third tube 36. Tube 36, like tube 32, is connected as a cathode follower and delivers its output to the fourth tube 37. The fourth tube 37, like tube 33, is connected as a diode having a parallel connection of capacitance 38 and resistor 39 disposed in its cathode circuit. Capacitor 38 charges upon conduction of tube 37 and together with resistor 39, has a time constant which in general is very large in comparison with the width of the pulse and compared to the time between pulses. The output of the fourth tube 37 is fed to a peak voltage detector 6a, which in this embodiment produces steady output signal that is very closely proportional to the peak value of a signal impressed on its input terminals. The output signal from the peak voltage detector 6a is fed in series with the output from a suitable anti-hunt generator 12 to one input of the balance detector 7.

The balance detector 7 includes a pair of vacuum tubes 41 and 42 connected in cascade, and so associated with the servo actuator 10 as to control the direction of rotation of shaft 11 according to the sense of output signal from the peak voltage detector 6 relative to a fixed reference potential. In particular, the output signal from peak voltage detector 6a is preferably positive and is applied in series through the anti-hunt generator 12 to the grid of tube 41. At this point the signal is compared with the fixed reference potential 8 which is applied to the cathode of tube 41 via potentiometer 9. In the balanced condition, potentiometer 9 is adjusted so that both tubes 41 and 42 are conducting a certain amount of current. When, however, the output from the peak voltage detector increases, the conduction current in tube 42 decreases. As it does so, it applies a differential bias to a pair of tubes in the servo actuator 10, which in turn causes a motor to rotate shaft 11 in one direction. Under the circumstances where the output signal from the peak voltage detector 6a decreases, the conduction current in the tube 42 increases. In this case the differential bias applied to the tubes in the servo actuator 10 causes the motor to rotate shaft 11 in the opposite direction.

In the servo actuator 10, the pair of tubes which control the rotation of shaft 11 are indicated at 43 and 44. The driving motor for operation of shaft 11 is indicated at 46 comprising a split field winding 45 connecting the plates of tubes 43 and 44 in push-pull relationship. In the balanced condition of the balanced detector 7, both tubes conduct equal currents and motor 46 is held stationary. In an unbalanced condition one tube 43 or 44, depending on the sense of the unbalance, conducts more than the other and the motor 46 rotates in such a direction as to restore the balance. In operation, the generator 12, the rotor of which is ganged to and rotated with shaft 11, produces a signal voltage which opposes the output of the peak voltage detector 6a so as to reduce hunting by motor 46.

To improve the performance of motor 46 the armature current applied thereto should be stabilized, such as by means of a lamp bank as indicated at 47.

In the embodiment of Fig. 3 the output from the receiver 3 is applied to a selector switch 27 which has two positions of contact D and E; position D is for pulse transmission and position E is for continuous wave transmission. In position E the output of the receiver 3 is applied directly to the input of the peak voltage detector 6a. In position D the output of the receiver is applied to a second selector switch 28 which also has two positions of contact F and G; position F for a positive pulse output from the receiver and position G for a negative pulse output from the receiver. In position F the signal is applied to a video amplifier 30 through an inverter, and in position G the signal is applied directly to the video amplifier 30. From the video amplifier 30 the signal is applied to a third selector switch 31 which also has two positions of contact H and I; position H is provided for RMS operation as hereinabove described, and position I is provided for peak signal operation. In position H the output from the video amplifier is applied to the grid of tube 36 in the pulse stretcher circuit 6b, and in position I the output from the video amplifier is applied to the grid of the first tube 32 in the pulse stretcher circuit.

Although I have shown and described only a limited and specific embodiment of the present invention it is to be understood that I am fully aware of the many modifications possible thereof. Reference therefore will be had to the appended claims for a definition of the limits of the invention.

What is claimed is:

1. In an apparatus for indicating and recording the radiation pattern of an antenna, means for varying the orientation of said antenna relative to a remote source of radiated energy, an energy attenuating means arranged in a series connection with said antenna, signal detecting means arranged to produce a steady output signal proportional to the output signal from said series connection, a source of reference potential, means comparing said reference potential with the output signal from said detecting means, control means responsive to said last named means for so operating said attenuating means as to maintain a balance between said reference potential and said output signal from said signal detecting means, an indicating and recording device arranged so as to indicate and record the action of said attenuating means, and means synchronizing said recording device with said orientation varying means.

2. In combination, an energy receiving means including an antenna, an energy attenuating means arranged in a series connection with said receiving means, said attenuating means including at least one moving element for controlling the attenuation thereof, signal detecting means arranged to produce a steady output signal proportional to the output signal from said series connection, a source of reference potential, means comparing said reference potential with the output signal from said detecting means, control means responsive to said last named means for so operating the moving element in said attenuating means as to maintain a balance between said reference potential and said output signal from said signal detecting means, a recording device including a recording medium and a recording element, means for varying the orientation of said antenna relative to a remote source of radiated energy, means synchronizing said recording medium with said variable antenna orientation, and means synchronizing said recording element with the moving element in said attenuating means.

3. In an apparatus for indicating and recording the radiation pattern of an energy receiving means, an energy attenuating means arranged in a series connection with said receiving means, said attenuating means including at least one moving element for controlling the attenuation thereof, signal detecting means arranged to produce a steady output signal proportional to the output signal from said series connection, a source of reference potential, comparing means for deriving a voltage proportional to the difference between said reference potential and the output signal from said detecting means, control means responsive to the output of said comparing means for so operating the moving element in said attenuating means as to maintain a balance between said reference potential and said output signal from said signal detecting means, an indicating and recording device including a recording medium and a recording element, means for varying the orientation of said energy receiving means relative to a remote source of radiated energy, means synchronizing said recording medium with said varying orientation of said receiving means, and means synchronizing said recording element with the moving element in said attenuating means.

4. In combination, an energy receiving means, an energy attenuating means arranged in a series connection with said receiving means, said attenuating means including at least one moving element for controlling the attenuation thereof, signal detecting means arranged to produce a steady output signal proportional to the output signal of said series connection, a source of reference potential, means comparing said reference potential with the output signal from said detecting means, control means responsive to said last named means for so operating the moving element of said attenuating means as to maintain a balance between said reference potential and said output signal from said signal detecting means, means for varying the orientation of said energy receiving means, an indicating and recording device including a recording medium and a recording element, means synchronizing said recording medium with said orientation varying means, and means synchronizing said recording element with the moving element of said attenuating means.

5. In a mobile installation moving in a circular path having a center located a predetermined distance from a source of radiated energy, energy receiving means, energy attenuating means connected to said energy receiving means, signal detecting means connected to said energy attenuating means for providing a control signal having a magnitude proportional to the output of said energy attenuating means, a source of signals providing a reference signal having a selected magnitude, means connected to said signal detecting means and to said source of signals for deriving a difference signal in dependency on the difference in the magnitudes between said reference signal and said control signal, means connected between said energy attenuating means and said last mentioned means and responsive to the difference signal for operating said energy attenuating means so as to maintain the difference in magnitudes between said control signal and said reference signal at a constant value, a recording device including a recording medium, a recording element, means for connecting said recording element to the energy attenuating means and for positioning said recording element in contact with the recording medium, and means connected to said recording device for maintaining the angle between a selected line in the recording device and a reference line in a predetermined plane substantially constant as said mobile installation moves in said circular path.

6. In a mobile installation moving in a circular path having a center located a predetermined distance from a source of radiant energy, energy receiving means, energy attenuating means connected to said energy receiving means, signal detecting means connected to said energy attenuating means for providing a control signal having a magnitude proportional to the output of said energy attenuating means, a source of signals providing a reference signal having a selected magnitude, means connected to said signal detecting means and to said source of signals for comparing the magnitudes of said reference signal and said control signal, means connected between said energy attenuating means and said last mentioned means and responsive to the output of said last mentioned means for operating said energy attenuating means so as to maintain the ratio of magnitudes of said control signal and said reference signal constant, a platform having a recording medium positioned thereon, a recording element, means for connecting said recording element to the energy attenuating means and for positioning said recording element in contact with the recording medium, a gyroscope, means for connecting said gyroscope to said platform, and means connected to said gyroscope for maintaining the angle between a selected line through the gyroscope and a reference line in a predetermined plane substantially constant while said gyroscope is in rotation.

7. In a mobile installation moving in a circular path having a center located a predetermined distance from a first radiant energy source, energy receiving means, energy attenuating means connected to said energy receiving means, signal detecting means connected to said energy attenuating means for providing a control signal having a magnitude proportional to the output of said energy attenuating means, a source of signals providing a reference signal having a selected magnitude, means connected to said signal detecting means and to said source of signals for deriving a difference signal in dependency on the difference in the magnitudes between said reference signal and said control signal, means connected between said energy attenuating means and said last mentioned means and responsive to said difference signal for operating said energy attenuating means so as to maintain the difference in magnitudes between said control signal and said reference signal at a constant value, a platform having a recording medium positioned thereon, a recording element, means for connecting said recording element to the energy attenuating means and for positioning said recording element in contact with the recording medium, a gyroscope including a shaft, control means connected to said shaft, said control means having a first operating condition in which a desired torque is applied to said shaft with a component opposing the frictional torque on said shaft and a second operating condition in which a desired torque is applied to the shaft with a component aiding said frictional torque, a second radiant energy source, a photo cell, means connected to said shaft and positioned between said second radiant energy source and said photo cell for permitting energy from said second radiant energy source to impinge on said photo cell only when the angle between a selected line through said shaft and a reference line in a predetermined plane exceeds a desired value, and means connected between said photo cell and said control means for placing the control means in said first operating condition when energy from said second radiant source fails to impinge on said photo cell and in said second operating condition when energy from said second radiant source impinges on said photo cell.

References Cited in the file of this patent

UNITED STATES PATENTS

| | | |
|---|---|---|
| 2,519,418 | Urick | Aug. 22, 1950 |
| 2,602,924 | Schmitt et al. | July 8, 1952 |
| 2,647,813 | Watson | Aug. 4, 1953 |
| 2,701,876 | Mottley et al. | Feb. 8, 1955 |